3,517,102
OXYTETRACYCLINE ANTIBIOTIC COMPOSITIONS EMPLOYING N-(BETA-OXYETHYL) PIPERAZINE OR N-N'BIS - (BETA - OXYETHYL) PIPERAZINE AND MAGNESIUM CHLORIDE
Ivan Rolovich, Naples, and Pasquale Sorrentino, Capua, Italy, assignors to Pierrel S.p.A., Milan, Italy, an Italian body corporate
Filed Sept. 24, 1965, Ser. No. 489,850
Claims priority, application Great Britain, Oct. 19, 1964, 42,573/64
Int. Cl. A61k *21/00*
U.S. Cl. 424—227                                      6 Claims

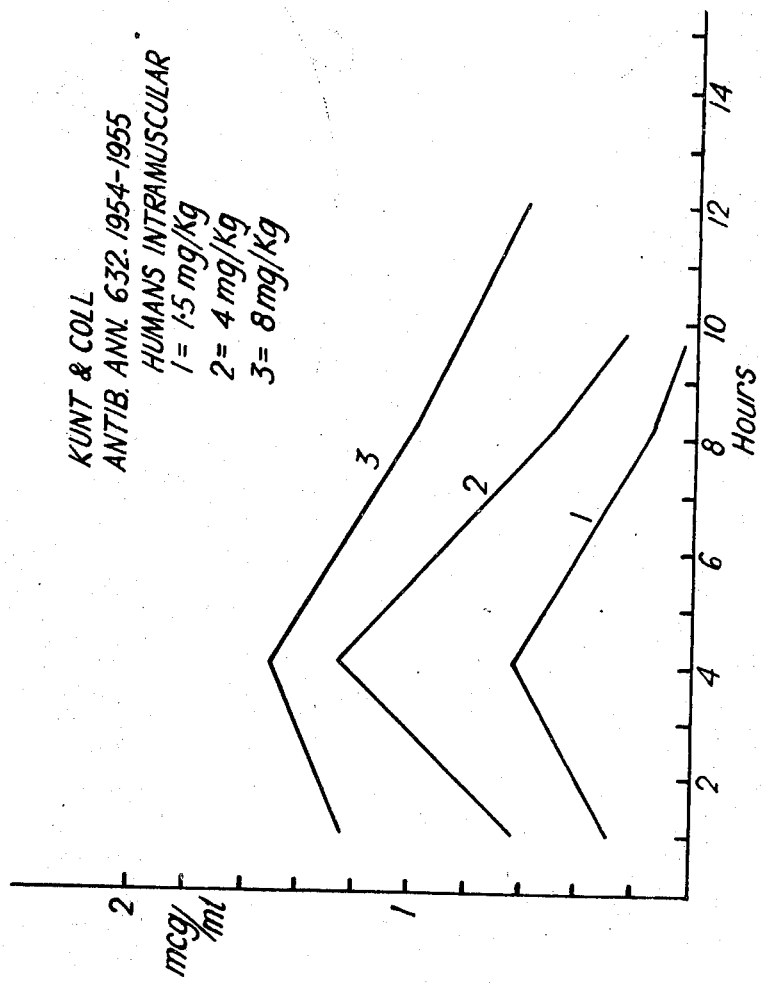

ABSTRACT OF THE DISCLOSURE

Stable liquid antibiotic compositions are prepared by dissolving oxytetracycline base in an aqueous propylene glycol or glycerol vehicle containing magnnesium chloride and N-(beta-oxyethyl) piperazine or N-N'bis-(beta-oxyethyl) piperazine. Either of the piperazine compounds may be used in compositions for oral administration whereas, for parenteral administration, the N-N'bis-(beta-oxyethyl) piperazine compound is used. Sodium sulphoxylate may be used as an antioxidant.

---

The present invention relates to parenteral and peroral stable solutions of oxytetracycline.

It is generally known that the antibiotic of the series of the tetracyclines, of which oxytetracycline is a member, are broad spectrum antibiotics, effective against a large number of infective microorganisms and which are largely utilised in therapy for oral, topical and parenteral administration.

The chemical forms of oxytetracycline which are commonly employed for oral and parenteral administration are the amphoteric base and the hydrochloride. The basic form is insoluble in water and therefore can be utilised only in pharmaceutical compositions such as coated tablets, capsules and suspensions for oral administration.

The blood levels which are achieved by means of these pharmaceutical forms based on amphoteric oxytetracycline are irregular and depend on each individual and particularly on the pH of the gastric juice, at the moment of the administration; in fact the insoluble base must be transformed into the soluble hydrochloride form by the HCl present in the gastric juice and create in that way the desirable conditions for a rapid adsorption for the active principal by the gastric walls.

It is evident that not indifferent disadvantages are connected with such administrable pharmeutical forms and consequently the results obtained in different individuals are not always the same.

Furthermore the oral administrable suspensions prepared with the amphoteric form of oxytetracycline have the disadvantage of all suspensions; the active principal is not homogeneously distributed and the individual dosages result in irregular adsorption of the medicine.

The hydrochloride form of oxytetracycline which is soluable can be employed for the preparation of coated tablets and injectable solutions.

It cannot be utilized for the preparation of syrup pharmaceutical forms, because of the instability of its solutions.

The hydrochloride form of oxytetracycline has an acid pH value (ranging about 2.2–2.5) and it needs, for the preparation of injectable solutions, considerable quantities of buffers. The administration is always very painful.

The solutions of the oxytetracycline hydrochloride, also if buffered, are not stable and when they come into contact with the tissue fluid or with the blood serum, they are rapidly hydrolysed giving the insoluable base. For that reason the dosages for intramuscular administation are limited to 100 mg. only. In consequence, the blood levels are low and the therapeutically valuable concentration of oxytetracycline in the blood disappears rapidly.

The accompanying drawing graphically shows blood levels attained at various time intervals when conventional oxytetracycline preparations at three different dosage levels are administered to humans by intramusclar injection.

The three graphs show that, after a small blood concentration of antibiotic at 1 hour after administration, the blood concentration of antibiotic reaches a maximum after 4 hours then decreases very rapidly after about 6 to 10 hours. After 6 hours practically no therapeutically valuable concentration of antibiotic is present in the blood. It is therefore necessary to repeat the administration every 4–6 hours.

The disadvantages of the injectable pharmaceutical forms constituted by antibiotic powder to which the solvent must be added prior to administration, are mainly constituted by the use of the hydrochloride form. In addition, the practical preparation of the injections, using the sterile powder and the solvent is always laborious for the physician, giving always serious doubts as to the sterility conditions during the preparation of the injection.

Consequently, it is evident that the actually used pharmaceutical forms of oxytetracycline administrable both orally and parenterally, are not the successful and desired forms because of the various and remarkable disadvantages which are connected with their administration and with the adsorption by the human body.

Moreover the fact that the maximum concentration of antibiotic substance cannot exceed the range of 100 mg. for the intramuscular formulation constitutes a remarkable hindrance.

It has been always desirable, therefore, to succeed in obtaining a suitable stable pharmaceutical solution of oxytetracycline which could be administrable both parenterally and orally.

It is obvious the great advantages which could be achieved in the provision of a ready made stable solution of oxytetracycline, which could be administered orally or parenterally, assuring rapid and regular adsorption and maintaining useful therapeutic blood levels.

An object of the present invention is to provide a new parenteral and peroral stable and soluble composition of oxytetracycline, which is characterised by the property of being homogeneous, stable, ready for use and which allows a regular, rapid adsorption of the antibiotic, either by the gastro-enteric walls, or capillary walls of tissue.

The blood levels attained by means of the administration of these parenteral ready made solutions of oxytetracycline are maintained at high therapeutical concentrations for more than 8–10 hours.

After this period, the antibiotic concentration in the blood decreases slowly and therapeutically useful values are maintained for a period of 24 hours after the administration.

Such a clinical action allows the effect obtained to be considered with the stable solutions of oxytetracycline as being "a long acting one."

After the oral administration of the oxytetracycline composition of this invention, the clinical picture is slightly different. The oxytetracycline by the orally administered solution is rapidly adsorbed by the gastric walls, giving immediate high therapeutic levels of the antibiotic.

This rapid adsorption is followed also by a rapid excretion of the antibiotic, so that after 6 hours the administration should be repeated, if the dosage applied has been that of 250 mg. The advantages of the oral administration of this antibiotic solution lies in the fact that the high blood oxytetracycline concentration can be obtained in a short time after the oral administration; that no variations from individual to individual should result because the dosage is very precise, and the adsorption does not depend on the momentaneous pH value of the gastric juice.

Furthermore the soluble compositions prepared with the procedure of the invention, are characterised by the fact that they contain the antibiotic substance in the form of an aqueous solution at a slightly alkaline pH range, of being ready for use and possessing the maximum of stability, wherein the antibiotic substance is also stable and therefore such compositions can be advantageously administered orally and parenterally.

In a more precise form, the solutions ready for use contain essentially the antibiotic oxytetracycline in the form of the base, solubilised and maintained in stable form with N,N'-bis(beta-oxyethyl)-piperazine or N-(beta-oxyethyl)-piperazine, propylene glycole, or glycerol, water, magnesium chloride and a suitable antioxidant substance.

During the studies for the preparation of the desired compositions, we have found that monooxyethylpiperazine may be used as the solvent for the oral preparations, but cannot be used for the injectable solutions because it has a pronounced hypotensive action which enhances the same type of action of tetracycline. For that reason we have tried various other piperazine derivatives and have found that dioxyethylpiperazine has no hypotensive activity, and is suitable for the preparation of injectable solutions.

Another characteristic of the pharmaceutical composition herein described is constituted by the fact that the preparation for injectable administration is quite painless and easily tolerated; therefore is the solution for intramuscular injections ready for use, no local anaesthetic need be added. This fact represents a considerable advantage, enlarging the use of the injectable formulation without any limitation, as for instance, in the case of procaine sensitive patients.

The pharmaceutical formulations which have been prepared by this invention are composed essentially by:

| | Mg./ml. |
|---|---|
| Oxytetracycline base amphoteric pure | 25 to about 80 |
| | 25 to about 80 |
| Propylene glycol | 300 to about 1000 |
| Magnesium chloride hexahydrate | 12.5 to about 50 |
| N-N' - bis(beta-oxyethyl)-piperazine or N-(beta-oxyethyl)piperazine | 25 to about 100 |
| Rhodite A (formaldehyde sodium sulphoxylate) | 0 to about 5 |
| Bidistilled water. | |

The oxytetracycline base is suspended in a mixture of propylene-glycol-water; magnesium chloride and mono- or di-oxy ethylpiperazine are added and the mixture is stirred for few hours, until the oxytetracycline is completely dissolved. Rhodite A. is added, the volume adjusted and the solution filtered sparkling clear.

The following non-limitative examples illustrate the compositions of the present invention.

EXAMPLE 1

To a 2 lt. glass flask, equipped with stirrer and sintered glass bottom sparger, 750 gm. of propylene-glycol, 1.0 gm. of Rhodite A. 80 gm. of oxytetracycline base, 40 gm. of magnesium chloride hexahydrate and 80 gm. of N-N'-bis(beta-oxyethyl)piperazine are added. The mixture is then stirred and nitrogen is bubbled through the sparger, for about 10 hours, at room temperature. When the solubilisation of the components is complete, the total volume is brought to 1 lt. by the addition of distilled water. The solution so obtained, is sterilised by filtration, through the membrane filter (porosity: 0.25μ). The solutions is bright yellow in colour, sparkling clear and contains 80 mg./ml. of oxytetracycline activity. This solution may be distributed into vials for intramuscular or intravenous injections; as follows: 3.2 ml. per vial for 250 mg. intramuscular injection, 6.5 ml. per vial for 500 mg. intravenous infusion only.

EXAMPLE 2

To a 2 lt. glass flask, equipped with stirrer and sintered glass bottom sparger 585 gm. of propylene-glycol, 0.5 gm. of Rhodite A, 25 gm. of oxytetracycline base, 12.5 gm. of magnesium chloride hexahydrate and 31.0 gm. of N-N'bis(beta-oxyethyl)-piperazine are added.

The mixture is stirred and nitrogen is bubbled through the sparger, for about 10 hours, at room temperature. When the solution is complete, the volume is brought to 1 lt. with distilled water. The solution is sterilised by filtration through a membrane filter (porosity 0.25μ).

This solution is bright yellow in colour, sparkling clear and contains 25 mg./ml. of oxytetracycline activity. This solution may be distributed in vials for intramuscular and intravenous injections as follows:

4.0 ml. per vial for 100 mg. intramuscular injection
10 ml. per vial for 250 mg. intravenous injection.

The solutions as in Examples 1 and 2 have slightly alkaline reaction (pH between 7.5–8.5), are not pyrogenic, non-toxic, sterile and do not contain histamine like substances. They are well tolerated and are painless during the administration.

EXAMPLE 3

Two solutions are prepared as follows:

Solution A

Sodium saccharinate gm. 1.0, glycamil (ammonium salt of glycyrrhizinic acid) gm. 5.0 and 30 percent saccharose syrup are made up to a volume of 500 ml.

Solution B 50 gm. oxytetracycline base, 40 gm. N-(beta-oxyethyl)-piperazine or N-N'bis-(beta-oxyethyl)-piperazine, 20.0 gm. magnesium chloride hexahydrate, 230 gm. of glycerol (pharmaceutical grade); Solution B is stirred under nitrogen until the solution is complete. Solution A and solution B are mixed by slowly pouring solution B into solution A, with gentle stirring and bubbling nitrogen into the reaction vessel. The final solution is given a banana or raspberry flavour. The final volume is brought to 1 lt. with 30 percent saccharose syrup. The solution is filtered sparkling clear through clarifying membrane filters and is ready for use.

This solution is bright yellow in colour, sparkling clear; the reaction is slightly alkaline (pH is between 7.5–8.5), density is 1.14 and the activity in oxytetracycline is 45–50 mg./ml. The solution may be administered orally, one teaspoonful (5 ml.) as a single adult dosage.

The pharmacological studies have demonstrated that the oxytetracycline ready made solution is less toxic than the oxytetracycline itself, and that the blood levels for the injectable form are maintained above the useful therapeutic concentrations for longer periods than after the administration of the oxytetracycline.

In the following table the comparison between the toxicity in mice and rats of oxytetracycline and the oxytetracycline in ready made solution, are exposed.

$LD_{50}$ in mg./kg. intravenous

| | Mice | Rats |
|---|---|---|
| Oxytetracycline | 178 | 260 |
| Oxytetracycline in ready made solution | 202 | 328.4 |

LD$_{50}$ in mg./kg. intramuscular

Oxytetracycline in ready made solution _____ >450

The blood levels obtained in rats, dogs and humans after the administration of various dosages, are demonstrated in the following table.

| Dosage | | Blood concentrations in mcg./ml. of blood | | | | | | |
|---|---|---|---|---|---|---|---|---|
| | | 10 min. | 30 min. | 1 hr. | 3 hr. | 6 hr. | 12 hr. | 24 hr. |
| Rat, 5 mg /kg | Intravenous | 3.10 | 2.40 | 1.75 | 1.0 | 0.60 | <0.30 | |
| | Intramuscular | 2.00 | 2.90 | 2.08 | 1.50 | 0.50 | <0.30 | |
| Dog, 5 mg /kg | Intravenous | | 5.97 | 4.36 | 2.53 | 1.77 | 1.0 | 0.60 |
| | Intramuscular | | 2.76 | 4.88 | 2.68 | 6.64 | 1.20 | 0.65 |
| Man: | | | | | | | | |
| 100 mg | do | | | 0.82 | 0.70 | 0.60 | 0.50 | |
| 200 mg | do | | | 1.00 | 2.00 | 1.70 | 0.85 | 0.30 |
| 250 mg | do | | | 1.40 | 3.80 | 2.86 | 2.20 | 0.80 |
| 250 mg | Intravenous | | | 3.70 | 2.10 | 1.60 | 1.05 | 0.35 |
| 250 mg | Oral | | | 1.10 | 0.74 | 0.45 | | |

The foregoing tables show that by the use of the compositions of the invention therapeutical concentrations of antibiotics can be detected in the blood at 12 hours after administration and that useful values are maintained up to a period of 24 hours after administration.

We claim:

1. A stable liquid antibiotic composition, comprising oxytetracycline base dissolved in an aqueous propylene glycol or glycerol solvent containing, as a stabilizer for said oxytetracycline base, from about 12.5 to about 50 mg./ml. of magnesium chloride, based on magnesium chloride hexahydrate, and from about 25 to about 100 mg./ml. of a piperazine compound selected from the group consisting of N-N'bis-(beta-oxyethyl)-piperazine and N-(beta-oxyethyl)-piperazine.

2. A stable aqueous liquid antibiotic composition, comprising: from about 25 to about 80 mg./ml. of oxytetracycline base, from about 300 to about 1,000 mg./ml. of propylene glycol, from about 12.5 to about 50 mg./ml. of magnesium chloride, based on magnesium chloride hexahydrate, and from about 25 to about 100 mg./ml. of a piperazine compound selected from the group consisting of N-(beta-oxyethyl)-piperazine and N-N'bis-(beta-oxyethyl)-piperazine.

3. A composition as defined in claim 2, suitable for parenteral or oral administration, wherein the piperazine compound is N-N'bis-(beta-oxyethyl)-piperazine.

4. An orally administrable composition comprising the composition of claim 2 wherein the piperazine compound is N-(beta-oxyethyl)-piperazine.

5. The composition of claim 2 wherein up to about 5 mg./ml. of formaldehyde sodium sulphoxylate is included as an antioxidant.

6. A parenterally administrable composition comprising the composition of claim 3 wherein up to about 5 mg./ml. of formaldehyde sodium sulphoxylate is included as an antioxidant.

References Cited

UNITED STATES PATENTS 3,026,248   3/1962   Noseworthy et al.
3,155,587   11/1964   Reed et al.

ALBERT T. MEYERS, Primary Examiner

V. D. TURNER, Assistant Examiner

U.S. Cl. X.R.

424—250